(12) United States Patent
Uhrin et al.

(10) Patent No.: US 11,136,794 B2
(45) Date of Patent: Oct. 5, 2021

(54) TRANSMISSION MEANS FOR A MOTOR VEHICLE LATCH AND A MOTOR VEHICLE LATCH

(71) Applicant: Kiekert AG, Heiligenhaus (DE)

(72) Inventors: Michael Uhrin, Oak Park, MI (US); Scott Brown, Livonia, MI (US)

(73) Assignee: Kiekert AG, Heiligenhaus (DE)

( * ) Notice: Subject to any disclaimer, the term of this patent is extended or adjusted under 35 U.S.C. 154(b) by 841 days.

(21) Appl. No.: 15/871,274

(22) Filed: Jan. 15, 2018

(65) Prior Publication Data

US 2019/0218829 A1 Jul. 18, 2019

(51) Int. Cl.
*E05B 79/20* (2014.01)
*E05B 77/34* (2014.01)
*E05B 85/00* (2014.01)
*F16C 1/10* (2006.01)

(52) U.S. Cl.
CPC .............. *E05B 79/20* (2013.01); *E05B 77/34* (2013.01); *E05B 85/00* (2013.01); *F16C 1/107* (2013.01)

(58) Field of Classification Search
CPC ...... F16C 1/107; F16C 33/72; F16C 33/7816; F16C 33/7826; E05B 79/20; E05B 77/34; E05B 79/22; E05B 85/00; E05B 53/003; E05B 53/005; Y10T 292/57; Y10T 292/1047; Y10T 292/1082; Y10S 292/23; Y10S 292/53; E05C 9/20
See application file for complete search history.

(56) References Cited

U.S. PATENT DOCUMENTS

| 3,205,727 A * | 9/1965 | Sevrence | F16C 1/107 74/500.5 |
| 4,304,148 A * | 12/1981 | Hamman | F16C 1/107 74/502.4 |
| 4,534,239 A * | 8/1985 | Heimann | F16C 1/107 277/550 |
| 4,621,937 A | 11/1986 | Maccuaig | |
| 5,582,074 A * | 12/1996 | Kelley | F16C 1/103 74/502.4 |
| 5,988,011 A * | 11/1999 | Crepin | F16C 1/262 74/502.4 |

(Continued)

FOREIGN PATENT DOCUMENTS

| DE | 10 2011 120 882 A1 | 6/2013 | |
| DE | 102014221861 A1 * | 4/2016 | E05B 79/22 |

(Continued)

OTHER PUBLICATIONS

Machine Translation of DE 102014221861 A1, 2020, pp. 1-6 (Year: 2020).*

(Continued)

*Primary Examiner* — Christine M Mills
(74) *Attorney, Agent, or Firm* — Renner, Otto, Boisselle & Sklar, LLP

(57) ABSTRACT

A transmission means for a motor vehicle latch of a moving component of a vehicle, includes a tensile element to transmit an opening command from a handle to a motor vehicle latch, a stop bushing to connect to the handle or the motor vehicle latch, whereby the tensile element passes through the stop bushing, whereby the stop bushing has at least a sealing mounting, whereby at least a sealing element is arranged at least partly in the sealing mounting.

14 Claims, 2 Drawing Sheets

(56) References Cited

U.S. PATENT DOCUMENTS

Figure 1:
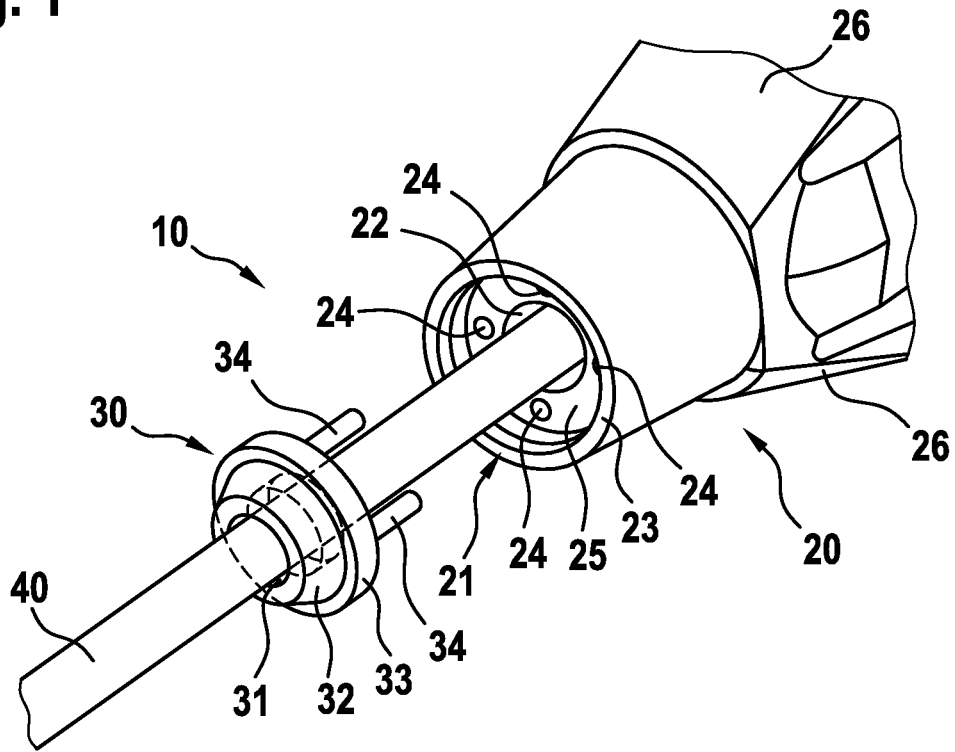

| | | | | |
|---|---|---|---|---|
| 10,584,519 B2* | 3/2020 | Hager | ............... | F16C 1/101 |
| 2015/0094462 A1* | 4/2015 | Markiewicz | ............ | C07H 23/00 |
| | | | | 536/27.6 |
| 2019/0316388 A1* | 10/2019 | Gotzen | ................ | E05B 85/02 |

FOREIGN PATENT DOCUMENTS

| | | | | |
|---|---|---|---|---|
| EP | 0686780 A1 * | 12/1995 | ............ | F16C 1/107 |
| EP | 1336706 A1 | 8/2003 | | |
| EP | 3296579 A1 | 3/2018 | | |
| FR | 3001249 A1 | 7/2014 | | |
| JP | 2009121524 A | 6/2009 | | |
| WO | 2013/083116 A2 | 6/2013 | | |
| WO | 2016165695 A1 | 10/2016 | | |

OTHER PUBLICATIONS

International Search Report and Written Opinion dated May 6, 2019, for International Patent Application No. PCT/IB2019/000004.

\* cited by examiner

TRANSMISSION MEANS FOR A MOTOR VEHICLE LATCH AND A MOTOR VEHICLE LATCH

The invention relates to a transmission means according to the pre-characterising clause of the independent patent claim 1 and a motor vehicle latch according to the further independent claim.

From DE 10 2011 120 882 A1 a motor vehicle door latch is known whereby a transmission means is provided for that transmits a force from the door handle to the latch. The transmission means is connected to the latch housing. However, it is disadvantageous that moisture and other external environmental impacts can penetrate the interface between the latch housing and the transmission element.

The task of the invention is to rectify disadvantages known from the state of the art, at least partly. In particular, it is the task of the invention to provide reliable sealing of a transmission means to a motor vehicle latch of a moving component of a vehicle.

The task is solved with a transmission means for a motor vehicle latch according to the independent patent claim 1 and with a motor vehicle latch according to the further independent patent claim.

Advantageous further formations and improvements of the invention are stated in the sub-claims. It is pointed out that the exemplary embodiments described below for explanation of the invention are not restrictive, but instead numerous combination and variation options of the characteristics described in the description, the drawings and the sub-claims for execution of the invention result. Characteristics and details, which have been described in conjunction with the transmission means according to the invention, naturally also apply in conjunction with the latch according to the invention and respectively vice versa, so that with regard to the disclosure on the individual invention aspects reference is always made or can be made reciprocally.

According to a first aspect of the invention, a transmission means is proposed for a motor vehicle latch of a moving component of a vehicle, in particular for a door, sliding door, flap, tailgate or hood. The transmission means has a tensile element to transmit an opening command from a handle to a motor vehicle latch and a stop bushing to connect to the handle or the motor vehicle latch, whereby the tensile element is passed through the stop bushing. According to the invention, the stop bushing has at least a sealing mounting, whereby at least a sealing element is arranged at least partially in the sealing mounting.

The sealing element can also be formed as a single component with the sealing mounting. For example, the sealing element can be surrounded by the sealing mounting, at least partly. The transmission means can also be understood to be a tensile means within the scope of the invention. The transmission means can preferably transmit a tensile force from a handle to a motor vehicle latch. An opening desire can thus be executed by operating the handle. The transmission means can be attached in particular to the motor vehicle latch at one end.

The purpose of the transmission means, in particular the tensile element, is to flexibly transmit the force of a drive or a handle to the motor vehicle latch, whereby this can be transmitted at least from a bolting position to an unbolting position. Of particular preference is the fixing of one end of the transmission element or the tensile element to a connecting element of an operating lever of the motor vehicle latch.

Within the scope of the invention, a handle can be an operating element such as a door handle or a handle element of a flap, tailgate or hood.

The tensile element is advantageously flexible. A flexible tensile element can be understood to mean a rope, a wire, a chain, a belt, a strap or a joint rod. However, it is particularly advantageous for the tensile element to be arranged flexibly and in a spatially beneficial manner. For example, it can be a Bowden cable which is also especially wear-resistant, in addition to practically loss-free force transmission. Such a Bowden cable usually consists of at least a metal wire or at least a wire rope so that forces can also be transmitted along bends.

According to the invention, it is conceivable for the transmission means to be sealed or enclosed. In particular having at least a shell, in particular with a slidable coating, such as a PTFE (PTFE-Polytetrafluorethene) or graphite coating, a flexible tensile element and at least a stop bushing and at least a liner in which the flexible tensile element can be arranged. The shell acts as a mechanical guide for the flexible tensile element and as a counterbearing for the tensile forces transmitted so that the flexible tensile element can also transmit forces along bends. The slidable coating of the flexible tensile element or the shell reduces the friction of the tensile element during movement within the tensile shell or within the liner and thus causes great durability and protection from environmental impacts, in particular dirt and moisture. Furthermore, a coating and an enclosed tensile shell gives an advantage compared to customary galvanized and stainless steel strokes due to lesser friction and additional protection from moisture.

The stop bushing is preferably arranged, and in particular attached, on or on top of the shell, at least in part. The flexible tensile element is passed through the shell and the stop bushing.

It is conceivable that the sealing element is surrounded by the sealing mounting, at least in part. The sealing mounting thus forms a housing for the sealing element, whereby this is protected from external influences, in particular forces exerted. The sealing element preferably has a softer material than that of the sealing mounting. The sealing mounting accordingly consists of a harder/firmer material which is more resistant to forces exerted. It is especially preferable that the sealing element is positively arranged/accommodated in the sealing mounting. Fundamentally, no external environmental impacts can thus penetrate. The sealing element has a material recess or hole, whereby the tensile element is guided. The sealing element can be in contact with the tensile element. Friction contact can consequently exist. It can thus be ensured that no moisture or similar environmental impacts can penetrate between the tensile element and the sealing element.

Advantageously, the sealing mounting is a hollow cylindrical shape or a hollow conical shape, in particular a blunt conical shape, whereby in particular a collar element is formed at the first end of the sealing mounting which protrudes from the sealing mounting. The collar element increases the reliability of the sealing function by protecting the sealing element by means of the collar element. Mechanical stresses such as forces exerted can therefore not damage the sealing element.

The stop bushing or the sealing mounting can be a hollow cylindrical shape or a hollow conical shape according to the invention. A hollow conical shape is especially simple and thus cost-effective to produce. A hollow conical shape or a blunt hollow conical shape require less material and can be of a space-saving design.

Within the scope of the invention, the sealing element can be formed as a sealing ring, in particular having a conical section and/or a centered pass-through for the tensile element. It is advantageous if the sealing element is formed predominantly in a geometrically complementary manner to the sealing mounting, in particular the internal diameter of the sealing mounting. Therefore if the sealing mounting is a cylinder or hollow cylinder, it is advantageous that the sealing element is formed as a sealing ring and is arranged in the sealing mounting. Sealing rings are simple and cost-effective to produce. The sealing element has a pass-through for the tensile element, for example a hole or a material recess.

The sealing element, in particular the sealing ring, can be arranged predominantly positively to the collar element within the scope of the invention at least on the external surfaces/cylinder shell surfaces of the sealing element. The sealing effect is improved accordingly and the sealing element is kept in a static position at least partly in the sealing mounting.

It can be advantageous for the collar element to protrude beyond the sealing element in the direction of the rotational axis. In the direction of the rotational axis means in the direction of the tensile element. The sealing function is improved by that sealing element being able to be reliably protected from mechanical damage.

Advantageously the sealing mounting, in particular arranged internally, has at least a fixing element so that the sealing element can be connected positively and/or in a force-fitting manner with the sealing mounting. It is conceivable that the fixing element is formed as a ratchet, clip or push-in connection.

Furthermore, it is conceivable that the at least one fixing element is formed as a pin shape as a material recess or at least a fixing element and extends out of the sealing mounting. Furthermore, the sealing element can have at least a fixing element, whereby the fixing element of the sealing element is positively or force-fittingly connected with the fixing element of the sealing mounting. The fixing element of the sealing element and the fixing element of the sealing mounting thus interact in a functional manner. It can also be called a push-in connection. The pin-shaped fixing element can interact accordingly with a geometrically complementary fixing element or vice versa. It is thus conceivable that the sealing element has pin-shaped fixing elements, whereby the pin-shaped fixing elements can be inserted into the fixing elements of the sealing mounting. Exact positioning and fixing of the sealing element in the sealing mounting can thus be attained, whereby the sealing function of the transmission means is further improved.

Within the scope of the invention, the sealing mounting can be formed as a plastic injection-molded component. Furthermore, the sealing element and/or the sealing mounting can have elastomers. In particular, the sealing mounting can be made of a harder material, for example plastic, a fiber-reinforced plastic or a metal. The sealing element is preferably flexible and made of a softer material, in particular rubber. A plastic injection-molded component is especially cost-effective to manufacture and simultaneously robust against external environmental impacts or forces exerted.

Advantageously the sealing mounting is connected or formed with the stop bushing and/or the shell in a force-fitting and/or positive manner and/or in a firmly bonded manner.

The task is solved by a motor vehicle latch according to a second aspect of the invention. The motor vehicle latch has at least a locking mechanism, having a catch and at least one pawl, and a transmission means according to the invention.

All characteristics and advantages which were previously described in conjunction with the transmission means apply accordingly, also in conjunction with the motor vehicle latch according to the invention.

The general purpose of the motor vehicle latch for a door or flap of a motor vehicle is to secure the door or flap from unintentional opening in the closed state of the door or flap, e.g. during a car trip.

A catch is fundamentally pivotably accommodated and can normally be pivoted between an opening position and a closure position. In particular, the catch can accommodate a locking bolt in the opening position which preferably goes into an infeed section of the catch during closure of the door or flap from an open position into a closed position and is thus accommodated by the catch. In particular, the catch with an accommodated locking bolt can pivot from the opening position into the closure position.

A pawl holds the catch in the closure position, in particular to securely hold the locking bolt by the catch in the closure position. Generally, the catch can be held in the closure position by means of the pawl in such a way that the catch cannot be unintentionally pivoted back into the opening position, e.g. by a locking bolt pulling into the opening direction. Unscheduled opening of the door or flap can thus be prevented by the pawl. In principle, the holding of the catch in the closure position can be executed by a ratcheting, namely in particular by a ratcheting of the pawl, preferably with a stop. The latch housing regularly encompasses a latch case and a latch lid, with the aid of which the latch case is closed. A locking mechanism is usually accommodated in the latch case which comprises a catch and an interacting pawl. The catch and consequently the motor vehicle door latch defined as such interacts with the locking bolt in a known manner.

The latch housing can be arranged on the chassis side or on the hood or door side. In the initially specified case, the latch housing is fixed to a motor vehicle chassis, by screwing for example. The variant specified second corresponds to the latch housing and the door latch being attached inside or on a door, a hood, a flap or similar.

The transmission means according to the invention is preferably connected to the latch housing in such a way that the tensile element is connected to an operating lever of the motor vehicle latch, whereby the latch can be unbolted. The transmission means is consequently arranged on an opening of the latch housing. External environmental impacts can penetrate through this opening without a transmission means according to the invention. Furthermore, on initial mounting or subsequent maintenance work in which the transmission means is separated from the latch housing and reconnected, mechanical forces can be exerted on the seal. Such damage can fundamentally be prevented by the transmission means according to the invention, whereby the sealing element is arranged in a sealing mounting.

The invention is explained in further detail hereinafter with reference to the adjacent drawings on the basis of some preferred exemplary embodiments. However, reference is made again to the fact that an embodiment of the invention is not limited to the depicted exemplary embodiments, but these only constitute advantageous embodiments. The characteristics portrayed can be advantageous individually or in combination with other characteristics of the description and also the patent claims individually or in combination. It must be heeded that the figures are only descriptive and are not intended to restrict the invention in any way.

The same or equivalent elements are described by the same reference numbers in the following embodiments and their duplicate description is dispensed with.

Figure 2:
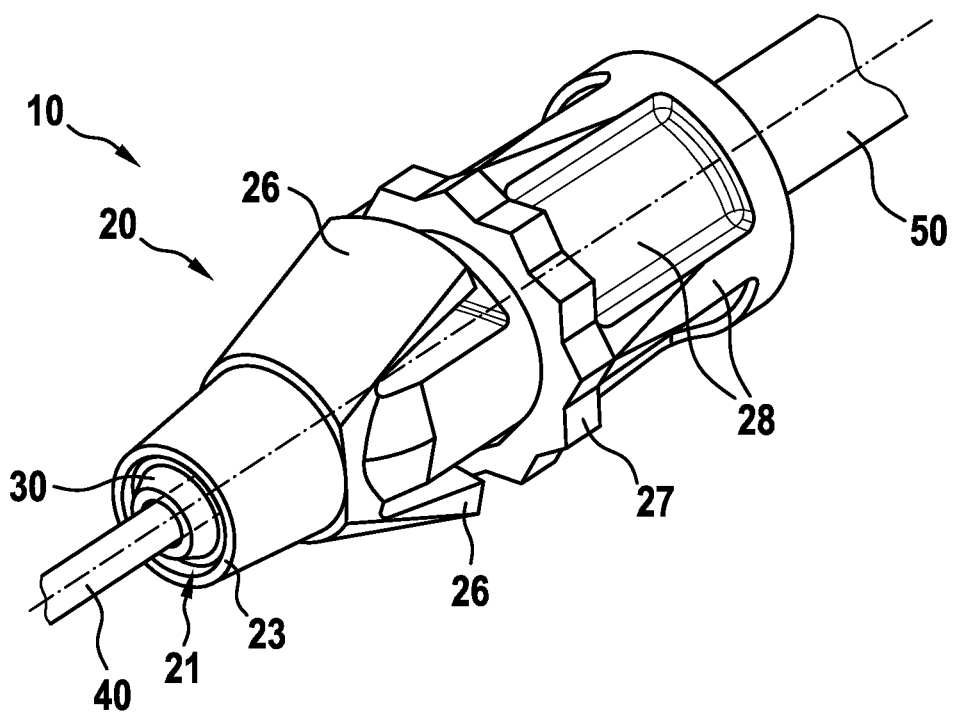
Figure 3:
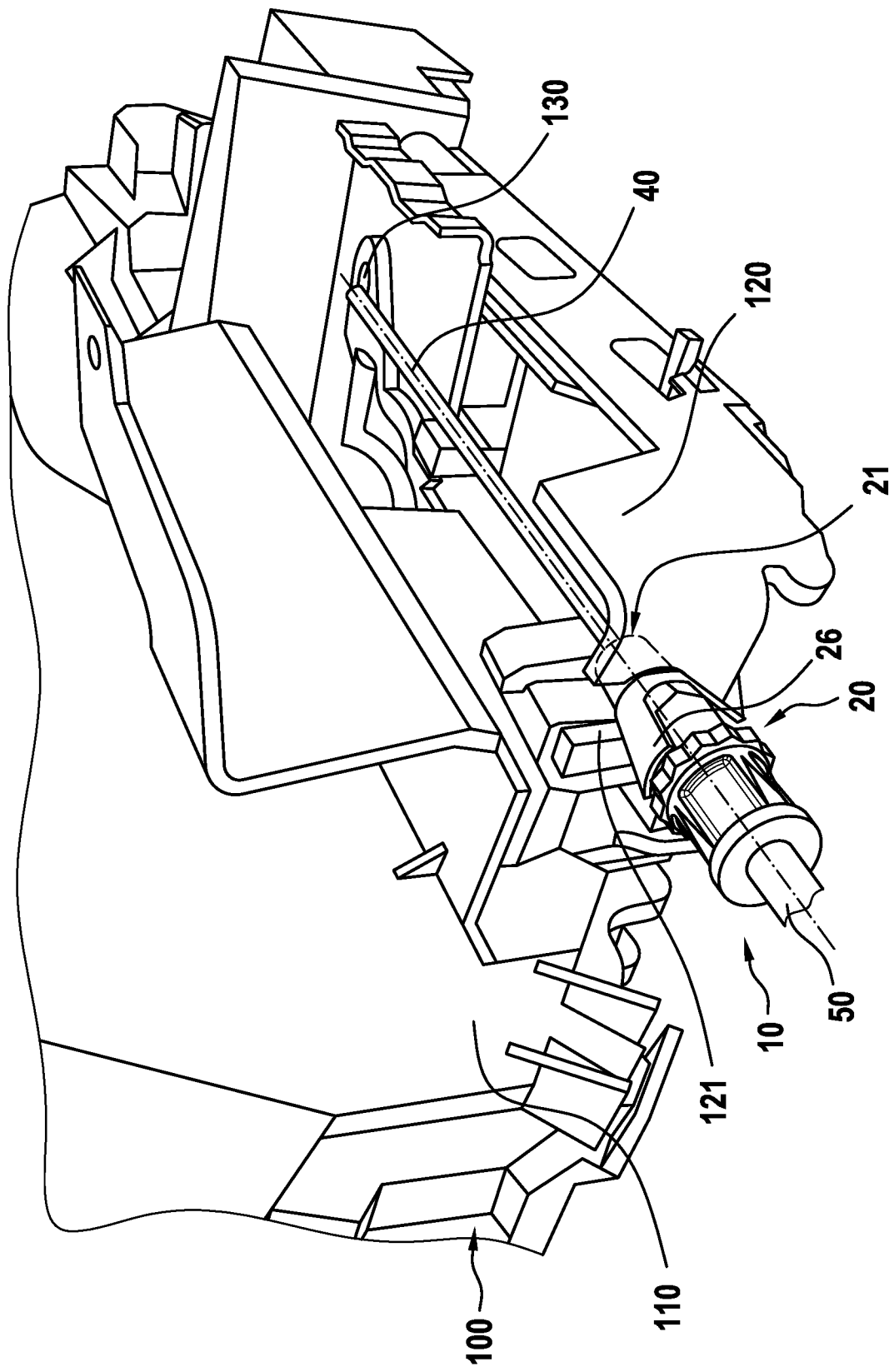

The following are shown:

FIG. 1 a possible embodiment of a transmission means according to the invention with dismantled sealing element, FIG. 2 the transmission means according to FIG. 1 with a mounted sealing element and FIG. 3 a possible embodiment of a motor vehicle latch according to the invention.

FIG. 1 depicts a possible embodiment of a transmission means 10 according to the invention. The transmission means 10 hereby has a stop bushing 20, a sealing element 30 and a tensile element 40. The stop bushing 20 for example connects the transmission means 10 to a motor vehicle latch or a handle of a motor vehicle. Fixing elements 26 are arranged on the stop bushing 20. The purpose of the fixing elements 26 is that the stop bushing 20 can be fixed and thus attached to a motor vehicle latch or a handle. The fixing elements 26 can be formed as ratchet or clip connections. FIG. 1 involves two fixing elements 26 which are formed in an elastic/flexible manner and can ratchet into a mounting on the motor vehicle latch or a handle.

Furthermore, the stop bushing 20 has a sealing mounting 21. In FIG. 1 the sealing mounting 21 is formed as a cylindrical mounting, so that a circular sealing element 30 can be arranged therein. The sealing element 30 is preferably arranged flush-mounted to the internal surface 25 of the sealing mounting 21, as shown in FIG. 2. The sealing mounting 21 has four fixing elements 24 in FIG. 1 which are formed as a hole in the sealing mounting 21 or the stop bushing 20. Furthermore, a recess 22 is formed in the sealing mounting 21, through which the tensile element 40, a preferably flexible tensile element 40 is conducted. The collar element 23 forms one end of the stop bushing 20. It is formed as an edge extending from the sealing mounting 21 and encompasses or surrounds the sealing element 30 in the mounted state at least on the cylindrical shell surfaces of the sealing element 30.

The sealing element 30 has a ring-shaped section with the external surface 33 and a conical section 32. Furthermore, the sealing element 30 has a recess 31 for the tensile element 40. The preferably flexible tensile element can be conducted through this recess 31 formed as a hole, whereby in particular a contact between the sealing element 30 and the tensile element 40 can be present, so that no dirt or water can penetrate. The sealing element 30 has fixing elements 34 on one side of the sealing element 30 on which the conical section is not arranged. The pin-shaped fixing elements 34 are shaped in such a way that these can be interlocked with the fixing elements 24 of the sealing mounting 21.

In FIG. 2, the embodiment of the transmission means 10 is shown from FIG. 1, whereby the sealing element 30 is mounted in the sealing mounting 21 of the stop bushing 20. It is apparent that the collar element 23 encompasses/surrounds the sealing element 30 at least in part, whereby the sealing element 30 is protected from external mechanical force impacts and can simultaneously maintain the sealing effect. A housing-type sealing mounting 21, in which the sealing element 30 is fixed thus results.

Furthermore, the handle sections 27 of the stop bushing 20 are apparent from FIG. 2. The handle section 27 has a toothlike structure and increases grip for mounting or dismantling, for example. The handle sections 28 consist of troughs 28 and bridges 28, whereby the ease of handling is also increased. A shell 50 is subsequently arranged on the handle section 28. The shell 50 is preferably flexible. The tensile element 40 is conducted and protected in the shell 50. The shell 50 hereby acts as a mechanical guide for the flexible tensile element 40 and as a counterbearing for the transmitted tensile forces, so that the flexible tensile element 40 can also transmit forces along bends.

FIG. 3 shows a possible embodiment of a motor vehicle latch 100 according to the invention. The motor vehicle latch 100 has at least a latch housing 110 and a latch plate 120. A mounting 121 for the stop bushing 20 of the transmission means 10 is formed on the latch plate 120. The fixing can be performed for example via the fixing elements 26 on the latch plate 120 or the mounting 121. The sealing mounting 21 is arranged within the motor vehicle latch 100 or the latch plate/latch case 120.

According to the invention, the sealing mounting 21 now prevents the sealing element arranged in the sealing mounting 21 from being damaged in the mounting of the transmission means 10 on the motor vehicle latch 100 as shown in FIG. 3.

The tensile element 40 is conducted through the shell 50 and the stop bushing 20 into the motor vehicle latch 100 and is fixed there to an operating lever 130. The shell 50 and the stop bushing 20 can be formed or interlocked as a single component, in particular in a materially uniform manner.

REFERENCE SIGN LIST

10 Transmission means
20 Stop bushing
21 Sealing mounting
22 Recess of Sealing mounting 21
23 Collar element
24 Fixing element
25 Internal surface
26 Fixing element
27 Handle section
28 Handle section
30 Sealing element
31 Recess of Sealing element 30
32 Conical section
33 External surfaces
34 Fixing elements
40 Tensile element
50 Shell
100 Motor vehicle latch
110 Latch housing
120 Latch plate
121 Mounting for 20
130 Operating lever

The invention claimed is:

1. A transmission for a motor vehicle latch of a moving component of a vehicle, the transmission comprising:
   a tensile element to transmit an opening command from a handle to the motor vehicle latch,
   a stop bushing to connect to the handle or the motor vehicle latch, whereby the tensile element is passed through the stop bushing, wherein the stop bushing has a sealing mounting, and
   a sealing element arranged in the sealing mounting, wherein the sealing element is formed in a geometrically complementary manner to an internal diameter of the sealing mounting,
   wherein the sealing mounting, internally, has a fixing element, so that the sealing element is positively and/or form-fittingly connected to the sealing mounting, wherein the sealing element has a fixing element, wherein the fixing element of the sealing element is positively and/or form-fittingly connected to the fixing element of the sealing mounting, and wherein the fixing element of the sealing mounting includes a plurality of holes formed in a radial surface of the sealing mounting, and wherein the fixing element of the sealing element includes a plurality of axially extending pins that extend from a ring-shaped section of the sealing element to be received in the plurality of holes.

2. The transmission according to claim 1, wherein the sealing element is surrounded at least partly by the sealing mounting.

3. The transmission according to claim 1, wherein the sealing mounting is a hollow cylindrical shape or a hollow conical shape, whereby, at a first end of the sealing mounting, a collar element is formed which extends in a protruding manner from the sealing mounting.

4. The transmission according to claim 3, wherein the sealing element is arranged, at least on external surfaces of the sealing element, positively on the collar element.

5. The transmission according to claim 3, wherein the collar element protrudes beyond the sealing element in the direction of a rotational axis of the sealing mounting.

6. The transmission according to claim 1, wherein the sealing element is formed of the ring-shaped section and a conical section that extends from the ring-shaped section, wherein the sealing mounting surrounds the ring-shaped section and the conical section.

7. The transmission according to claim 1, wherein the fixing element extends in a pin-shaped manner from the sealing mounting.

8. The transmission according to claim 1, wherein the sealing mounting is formed as a plastic injection-molded component and the sealing element and/or the sealing mounting has an elastomer.

9. The transmission according to claim 1, wherein the sealing mounting is positively and/or form-fittingly and/or firmly bonded to the stop bushing.

10. The transmission according to claim 1, wherein the sealing element is flush mounted to an internal surface of the sealing mounting.

11. The transmission according to claim 1, wherein the fixing element extends from the ring-shaped section on a side of the ring-shaped section that is opposite to a side from which the conical section extends.

12. The transmission according to claim 1, wherein the sealing mounting is formed as one part with the stop bushing as part of the stop bushing.

13. A motor vehicle latch comprising a locking mechanism with a catch and at least one pawl and at least a transmission according to claim 1.

14. A transmission for a motor vehicle latch of a moving component of a vehicle, the transmission comprising:

a tensile element to transmit an opening command from a handle to a motor vehicle latch, a stop bushing to connect to the handle or the motor vehicle latch, whereby the tensile element is passed through the stop bushing, wherein the stop bushing has a sealing mounting, and a sealing element arranged in the sealing mounting, wherein the sealing mounting includes a plurality of holes formed in an internal radial surface of the sealing mounting, and wherein the sealing element includes a plurality of axially extending pins that are received in the plurality of holes of the sealing mounting to interlock the sealing element and the sealing mounting.

* * * * *